(12) United States Patent
Li et al.

(10) Patent No.: US 10,977,230 B2
(45) Date of Patent: Apr. 13, 2021

(54) DATA INFORMATION PROCESSING METHOD AND DATA STORAGE SYSTEM

(71) Applicant: ALIBABA GROUP HOLDING LIMITED, Grand Cayman (KY)

(72) Inventors: Shengfeng Li, Hangzhou (CN);
Panfeng Yuan, Hangzhou (CN);
Tingliang Chen, Hangzhou (CN); Ji Li, Hangzhou (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 159 days.

(21) Appl. No.: 16/016,323

(22) Filed: Jun. 22, 2018

(65) Prior Publication Data

US 2018/0300360 A1 Oct. 18, 2018

Related U.S. Application Data

(63) Continuation of application No. PCT/CN2016/109400, filed on Dec. 12, 2016.

(30) Foreign Application Priority Data

Dec. 22, 2015 (CN) .......................... 201510973964.9

(51) Int. Cl.
*G06F 16/22* (2019.01)
*H04L 29/06* (2006.01)
(Continued)

(52) U.S. Cl.
CPC ....... *G06F 16/22* (2019.01); *G06Q 10/06312* (2013.01); *G06Q 30/06* (2013.01);
(Continued)

(58) Field of Classification Search
None
See application file for complete search history.

(56) References Cited

U.S. PATENT DOCUMENTS 9,632,878 B1 * 4/2017 Maccanti ............ G06F 16/2365
2013/0047230 A1 2/2013 Krishnan et al.
(Continued)

FOREIGN PATENT DOCUMENTS

CN 101315796 A 12/2008
CN 101499061 A 8/2009
(Continued)

OTHER PUBLICATIONS

PCT International Search Report and Written Opinion dated Mar. 8, 2017, issued in corresponding International Application No. PCT/CN2016/109400 (15 pgs.).
(Continued)

*Primary Examiner* — Robert W Beausoliel, Jr.
*Assistant Examiner* — Cheryl M Shechtman
(74) *Attorney, Agent, or Firm* — Finnegan, Henderson, Farabow, Garrett & Dunner, LLP

(57) ABSTRACT

The present disclosure discloses a data information processing method. A storage space corresponding to an organization is disposed in a data storage system. A data processing request type, the storage partition in which a project sending a data processing request is located, and the storage partition of the target data information corresponding to the data processing request are acquired when the data processing request is received. Subsequently, a processing strategy matching the storage partitions and the type is acquired. Finally, the target data information is processed according to the processing strategy and the data processing request. Thus, the isolation and rights control of different data in the same storage space can be achieved, and the security and mobility of data can be ensured.

15 Claims, 9 Drawing Sheets

(51) Int. Cl.
*G06F 3/06* (2006.01)
*G06Q 30/06* (2012.01)
*G06Q 10/06* (2012.01)

(52) U.S. Cl.
CPC ............ *G06F 3/062* (2013.01); *G06F 3/0644* (2013.01); *H04L 63/00* (2013.01)

(56) References Cited

U.S. PATENT DOCUMENTS

| | | | |
|---|---|---|---|
| 2014/0215590 | A1 | 7/2014 | Brand |
| 2015/0089115 | A1 | 3/2015 | Suenaga |
| 2015/0156218 | A1 | 6/2015 | Arun et al. |
| 2015/0370767 | A1* | 12/2015 | Sevilmis ................ G06F 16/27 715/255 |
| 2018/0267710 | A1* | 9/2018 | Deshpande ........... G06F 3/0649 |
| 2020/0142970 | A1* | 5/2020 | Madan .................... G06F 3/067 |

FOREIGN PATENT DOCUMENTS

| | | |
|---|---|---|
| CN | 101639835 A | 2/2010 |
| CN | 103067406 A | 4/2013 |
| CN | 103327084 A | 9/2013 |
| CN | 103491052 A | 1/2014 |
| CN | 103795690 A | 5/2014 |
| CN | 104270467 A | 1/2015 |
| CN | 104604201 A | 5/2015 |
| CN | 104767745 A | 7/2015 |
| CN | 104866976 A | 8/2015 |
| JP | 2006302240 A | 11/2006 |
| JP | 2015529367 A | 10/2015 |
| JP | 2015204087 A | 11/2015 |

OTHER PUBLICATIONS

European Patent Office Communication issued for Application No. 16877603.7-1221 which encloses the extended European Search Report which includes pursuant to Rule 62 EPC, the Supplementary European Search Report (Art. 153(7) EPC) and the European search opinion, dated Nov. 19, 2018 (9 pgs.).
First Search Report issued in related Chinese Patent Application No. 2015109739649, dated Mar. 22, 2019 (2 pgs.).
Japanese Search Report issued in corresponding Japanese Application No. 2018-532121 dated Dec. 16, 2020 (52 pages).

* cited by examiner

DATA INFORMATION PROCESSING METHOD AND DATA STORAGE SYSTEM

CROSS REFERENCE TO RELATED APPLICATION

The disclosure claims the benefits of priority to International Application Number PCT/CN2016/109400, filed Dec. 12, 2016, which claims priority to Chinese Application Number 201510973964.9, filed Dec. 22, 2015, both of which are incorporated herein by reference in their entireties.

BACKGROUND

Cloud computing is becoming increasingly popular in various industries, and the use of various big data scenarios is becoming increasingly widespread. Therefore, platform operators have a growing need to use and exchange data. Data can also be exchanged or transacted between different companies or enterprises. Conventionally, independent units (for example, Independent Software Vendors (ISV), and the like) having full resource management rights are referred to as organizations.

Currently, most data-oriented applications solve problems of data storage and computing. A data escrow service provider has to face a problem of how to provide security guarantees and sound management during data exchanges. In particular, the transaction or transfer of sensitive data in a public data market can involve the secure change of ownership and attribution between different organizations. Therefore, an access to data can be authorized between different Data Providers (DP) or within one DP, and changes to data can be exchanged between different DPs or within one DP.

SUMMARY OF THE DISCLOSURE

Embodiments of the disclosure provide a method for processing data information in a data storage system including a storage space. The method can include: receiving a data processing request; determining a request type of the data processing request, a first storage partition having a project sending the data processing request, and a second storage partition having target data information corresponding to the data processing request; acquiring a processing strategy matching the first and second storage partitions and the request type; and processing the target data information according to the processing strategy and the data processing request.

In some embodiments, the storage space is associated with an organization disposed in the data storage system, and the project is associated with the organization.

In some embodiments, the method can further include: in response to the determination of the request type being an authorization request, authorizing the target data information to be accessed by the project based on the data processing request; in response to the determination of the request type being a change request, changing attribute information of the target data information to target attribute information included in the data processing request; and in response to the determination of the request type being a presentation request, presenting the target data information on a data platform based on the data processing request.

In some embodiments, processing the target data information according to the processing strategy and the data processing request further includes: allowing execution of the data processing request when the second storage partition is a private partition and the data processing request is the presentation request or the change request; allowing execution of the data processing request when the first storage partition is in the storage space, the second storage partition is the private partition, and the data processing request is the authorization request; and allowing execution of the data processing request when the second storage partition is an exchange partition, the first storage partition is the exchange partition, and the data processing request is the authorization request.

In some embodiments, processing the target data information according to the processing strategy and the data processing request can further include: establishing, in a current storage partition including the target data information, a view identical to that of the target data information in the second storage partition; and keeping the view of the target data information in the current storage partition in response to the determination of rejecting the data processing request.

In some embodiments, the method can further include: receiving new data; and importing the new data into the private storage partition.

Embodiments of the disclosure provide a data storage system including a storage space. The system can include: a first acquisition module configured to receive a data processing request, and determine a request type of the data processing request, a first storage partition having a project sending the data processing request, and a second storage partition having target data information corresponding to the data processing request; a second acquisition module configured to acquire a processing strategy matching the first and second storage partitions and the request type; and a processing module configured to process the target data information according to the processing strategy and the data processing request.

In some embodiments, the storage space is associated with an organization disposed in the data storage system, and the project is associated with the organization.

In some embodiments, in response to the determination of the request type being an authorization request, the processing module authorizes the target data information to be accessed by the project based on the data processing request; in response to the determination of the request type being a change request, the processing module changes attribute information of the target data information to target attribute information included in the data processing request; and in response to the determination of the request type being a presentation request, the processing module presents the target data information on a data platform based on the data processing request.

In some embodiments, processing module is further configured to: allow execution of the data processing request when the second storage partition is a private partition and the data processing request is the presentation request or the change request; allow execution of the data processing request when the first storage partition is in the storage space, the second storage partition is the private partition, and the data processing request is the authorization request; and allow execution of the data processing request when the second storage partition is an exchange partition, the first storage partition is the exchange partition, and the data processing request is the authorization request.

In some embodiments, the processing module is further configured to reject and discard the data processing request when a processing strategy matching the storage partitions and the type does not exist.

In some embodiments, the system can further include: an import module configured to receive new data, and import the new data into the private storage partition

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

As used herein, unless specifically stated otherwise, the term "or" encompasses all possible combinations, except where infeasible. For example, if it is stated that a database can include A or B, then, unless specifically stated otherwise or infeasible, the database can include A, or B, or A and B. As a second example, if it is stated that a database can include A, B, or C, then, unless specifically stated otherwise or infeasible, the database can include A, or B, or C, or A and B, or A and C, or B and C, or A and B and C.

As discussed above, the security control over the ownership, attribution, and use rights of existing data is not complete. Currently, a scenario in which data is exchanged may exist. But the exchange of massive amounts of data information between organizations on a public cloud computing platform cannot be secured, and the effective protection of the ownership and attribution of data cannot be ensured.

In view of the foregoing problem, embodiments of the present disclosure provide a data information processing method. A data storage system in which a storage space corresponding to an organization is disposed in advance is provided. According to the storage spaces of the organizations, the data can be distributed between two storage partitions with different rights. In other words, the storage space can include a first storage partition and a second storage partition, and the data information can be separately stored in the two partitions. The organization in embodiments of the present disclosure may include an individual user, a company user, or the like.

Figure 1:
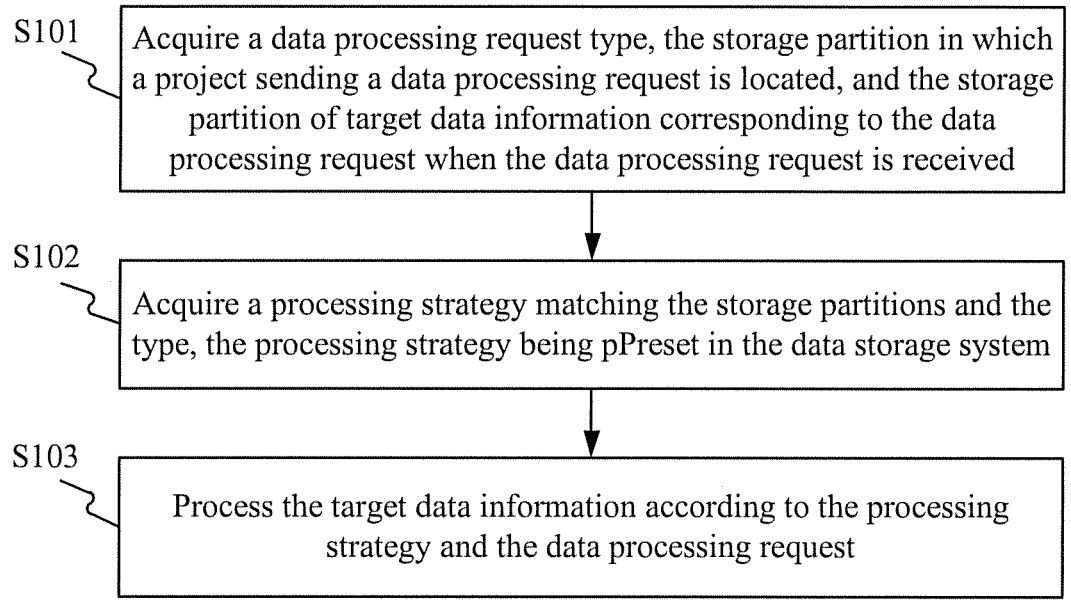
FIG. 1 is a flowchart of a data information processing method according to embodiments of the present disclosure.

FIG. 1 is a flowchart of a data information processing method 100 according to embodiments of the present disclosure. As shown in FIG. 1, method 100 includes steps S101-S103.

In step S101, when a data processing request is received, a type of the data processing request, an original storage partition associated with the data processing request, and a target storage partition associated with the data processing request can be acquired. The original storage partition can store a project that sends the data processing request. The target storage partition can store target data information corresponding to the data processing request.

Figure 2:
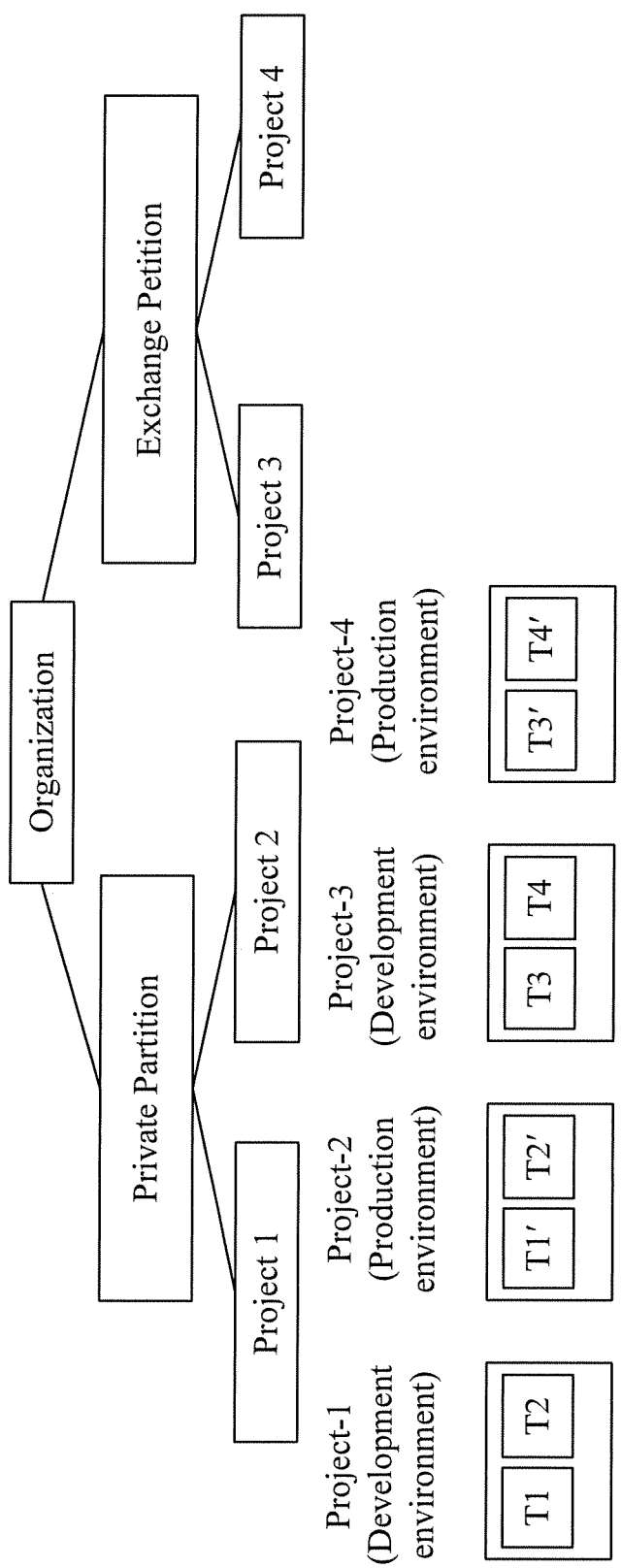
FIG. 2 illustrates a diagram of a data exchange support model according to embodiments of the present disclosure.

In a data exchange support model provided in embodiments of the present disclosure shown in FIG. 2, all data of a same organization in the data storage system is stored in partitions including a private partition and an exchange partition. Subsequently, the functions of exchanging and trading data in a market can be provided based on this model.

Data to be exchanged or traded in the data storage system can belong to an organization. An organization can include two logic areas: a private partition and an exchange partition. A series of use and exchange actions (e.g., processing, shelving, and trading) is performed on all the data of the organization in these two partitions. Correspondingly, a given project space may be the private partition or the exchange partition. After a project space is created, a project developed or exchanged in the project space and tables in the project (for example, T1 and T2 here) can belong to the partition.

For example, the first storage partition can be set as the private partition and the second storage partition can be set as the exchange partition.

Based on data information in the storage partitions, operation types can be defined for operations on data information. The operation types can include an authorization request, a change request, and a presentation request.

For an authorization request operation type, a data processing request of the authorization request type can be initiated, when a project of an organization uses data information in another partition. The data processing request can be used to authorize the target data information to the project, to enable the project to access the target data information, the project belonging to the organization.

For an change request operation type, an organization which data information belongs to can change after the data information is purchased by a purchaser organization from an original organization. In embodiments of the present disclosure, operations are performed by using backend data. Therefore, information can be changed when data information is purchased. A data processing request can carry target data information (e.g., including target attribute information). The data processing request can change attribute information of the target data information associated with the original organization to the target attribute information associated with the purchaser organization, to which the data is transferred or transacted.

For a presentation request operation type, in the process of selling or transferring data information, the data information may be presented to another person for browsing.

Therefore, a data presentation request can be used to present the target data information on a data platform.

Referring back to FIG. 1, in step S102, a processing strategy can be acquired based on the original storage partition, the target storage partition, and the type. The processing strategy can be preset in the data storage system.

Based on the different types of data processing requests provided in step S101, in this step (step S102), the storage partition in which data information is currently located is used to perform processing strategy matching. Corresponding processing strategies can be set for different storage partitions and types. Therefore, in step S102, a matching processing strategy can be queried according to the storage partitions and type. It can be determined, however, that a processing strategy matching the storage partitions and the type does not exist if a corresponding processing strategy is not found, and the data processing request can be rejected and discarded.

To distinctively process request types such as authorization, change, and presentation, several processing strategies can be provided.

In a first processing strategy, the data processing request can be an authorization request, and the storage partition of the target data information can be the first storage partition. In this case, if the storage partition where the project is located belongs to the storage space, execution of the data processing request is allowed.

In a second processing strategy, the data processing request can be an authorization request and the storage partition of the target data information can be the second storage partition. In this case, if the storage partition where the project is located belongs to the second storage partition, execution of the data processing request can be allowed.

In a third processing strategy, the data processing request can be a presentation request or a change request. In this case, if the storage partition of the target data information is the first storage partition, execution of the data processing request can be allowed.

Figure 3:
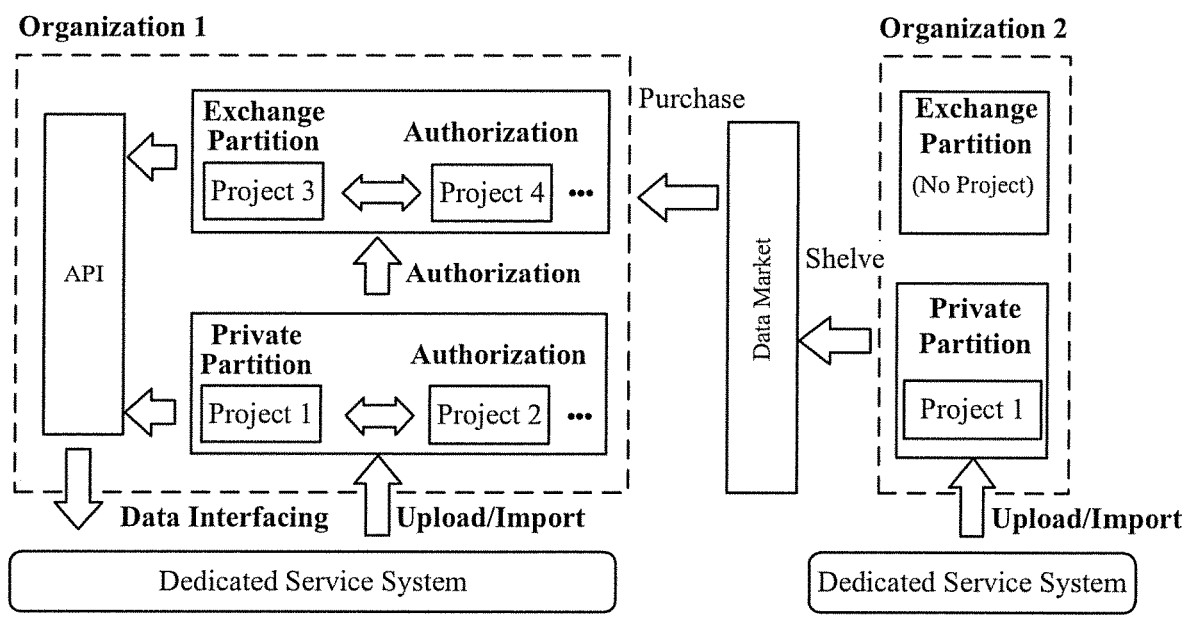
FIG. 3 illustrates a schematic diagram of the exchange of data between partitions according to embodiments of the present disclosure.

Based on the data exchange support model as shown in FIG. 2, a schematic diagram of the exchange of data information between partitions (across different organizations) can be illustrated, as shown in FIG. 3. It is appreciated that, data of the private partition of a given organization may be authorized to a project space in the exchange partition or the private partition of the organization. At the same time, the organization may choose to shelve the data in a data market to provide the data to another organization for trading. For example, the data can be exchanged across organizations. In other words, authorization requests, change requests, and presentation requests can be executed for data in the private partition. Data in the exchange partition of the organization can be exchanged between different projects, but cannot be shelved or authorized to the private partition. That is, only authorization requests from the same storage partition can be executed.

In some embodiments of the present disclosure, new data information uploaded by an organization can be imported into the first storage partition when the storage space of the organization receives new data information. That is, data uploaded or imported by a service system can only first enter the private partition. For example, if a technician of an organization uploads data information to a storage space of the organization, a dedicated service system can be used to upload the data to the private partition. If the technician downloads data information from the storage space of the organization, an API corresponding to the storage space (including the exchange partition and the private partition) can initially export the data, and the data information can be downloaded only after the service system and the API are successfully interfaced.

Figure 4:
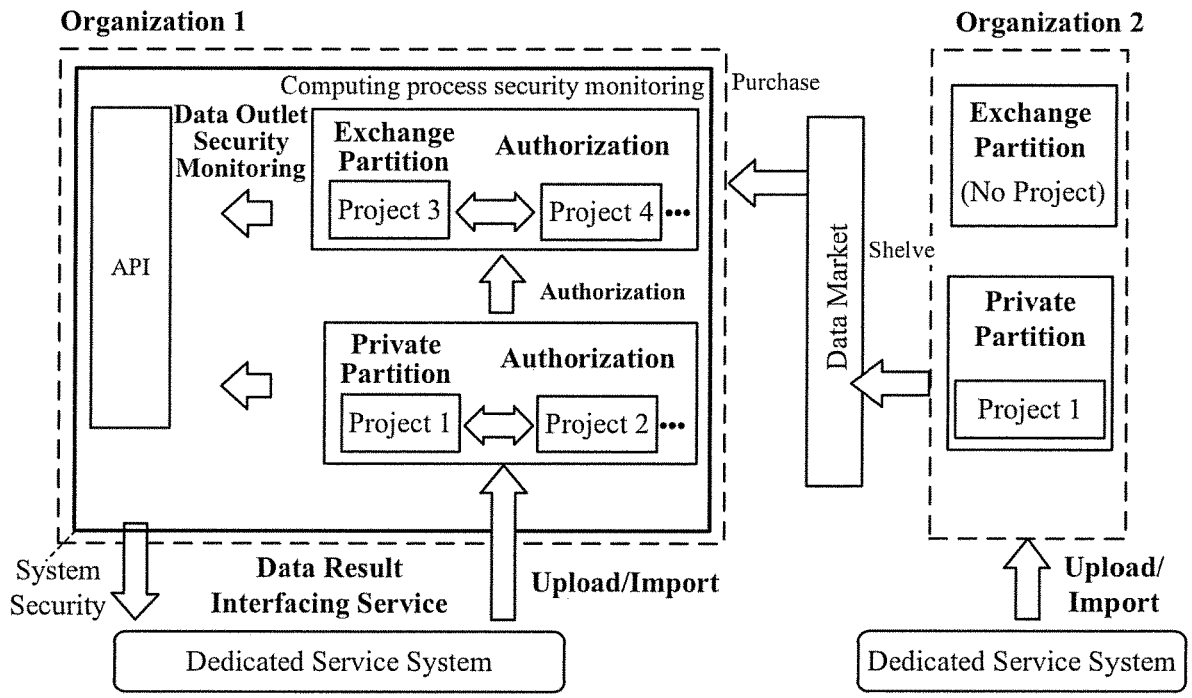
FIG. 4 illustrates a schematic diagram of data security monitoring in an exchange partition according to embodiments of the present disclosure.

To ensure the data security of data during exchange (especially during trading), security monitoring can be performed for operations on data information in the exchange partition, for example as shown in FIG. 4. Security monitoring can be performed on the entire computing process in the exchange partition of the organization once data is purchased, and corresponding security monitoring can be performed at an interface through which the data is exported by using an API.

Referring back to FIG. 1, in step S103, the target data information can be processed according to the processing strategy and the data processing request.

Data in different data storage partitions of organizations is mainly processed in the backend in the present disclosure. Therefore, during the exchange of data, a data migration operation (for example, transferring the data from a server to another server) may not be performed. Instead, view authorization and views can achieve the use of data by different organizations or for different projects. Therefore, in embodiments of the present disclosure, the specific process of performing this step can include two sub-steps as below.

In a first sub-step, in the current storage partition of the target data information, a view identical to that of the target data information can be established in the original storage partition after the data processing request is executed in response to the determination, according to the processing strategy, that execution of the data processing request is allowed.

In a second sub-step, the view of the target data information can be kept in the current storage partition in response to the determination, according to the processing strategy, that execution of the data processing request is rejected.

Figure 5:
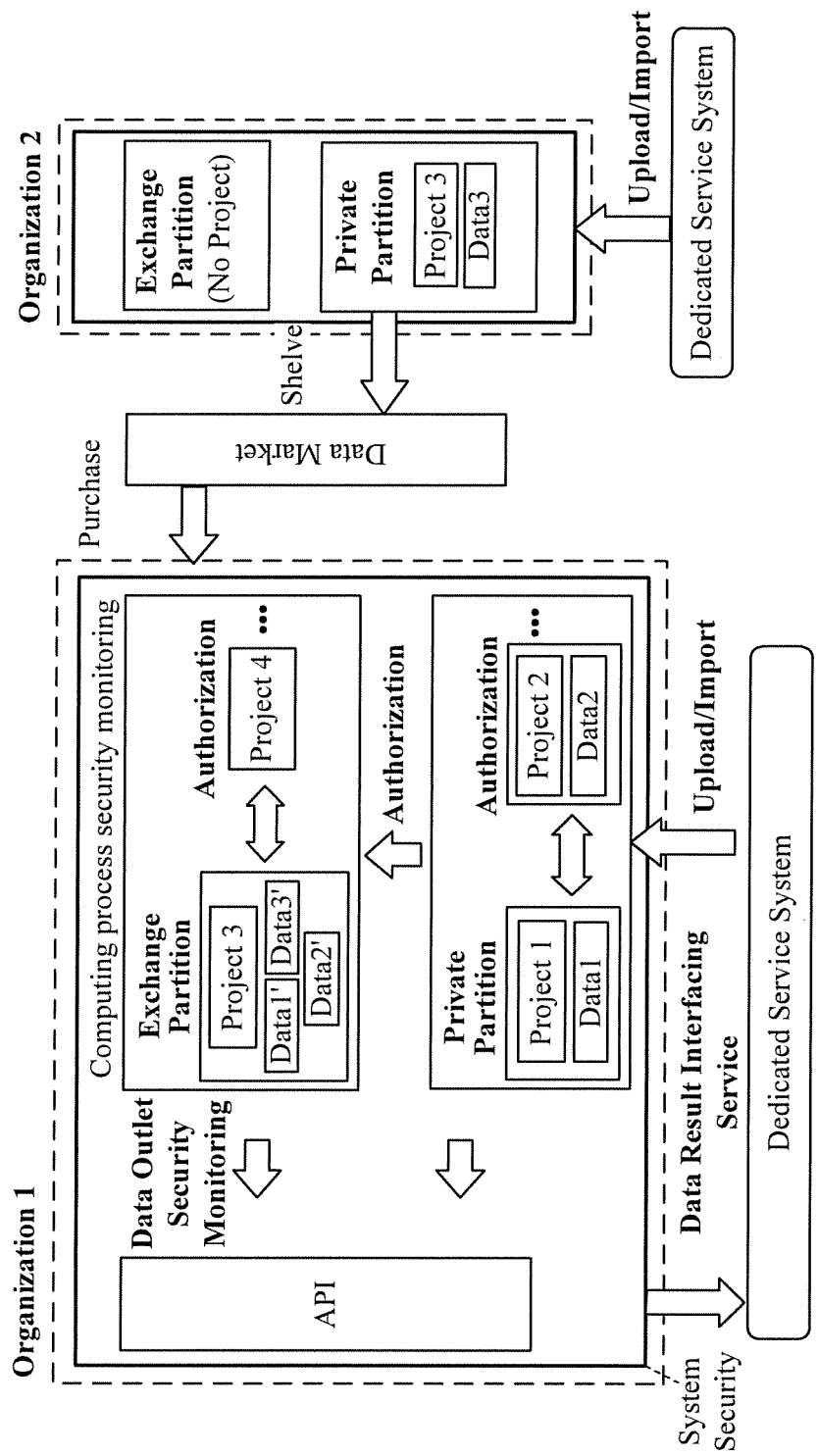
FIG. 5 illustrates a schematic diagram of an authorization strategy for data between partitions according to embodiments of the present disclosure.

FIG. 5 is a schematic diagram of an authorization strategy for data between partitions according to embodiments of the present disclosure. In some embodiments, data in a private partition can be authorized to an exchange partition of a same organization. For example, as shown in FIG. 5, authorization of a data table Data1 of Project 1 in a private partition of Organization 1 can be requested by Project 3 in an exchange partition, and can be granted. Then, a view of Data1' can be established in Project 3 in an exchange partition of Organization 1 to complete the authorization of data of the data table Data1. Similarly, authorization of Data3 of Project 3 in the private partition of Organization 2 in FIG. 5 can be requested by Project 3 in the exchange partition of Organization 1 and can be granted. Then, a view of Data3' can be established in Project 3 in the exchange partition of Organization 2 to complete authorization of the data of data table Data 3.

To further illustrate the technical concept, some embodiments of the present disclosure are further described below.

Figure 6:
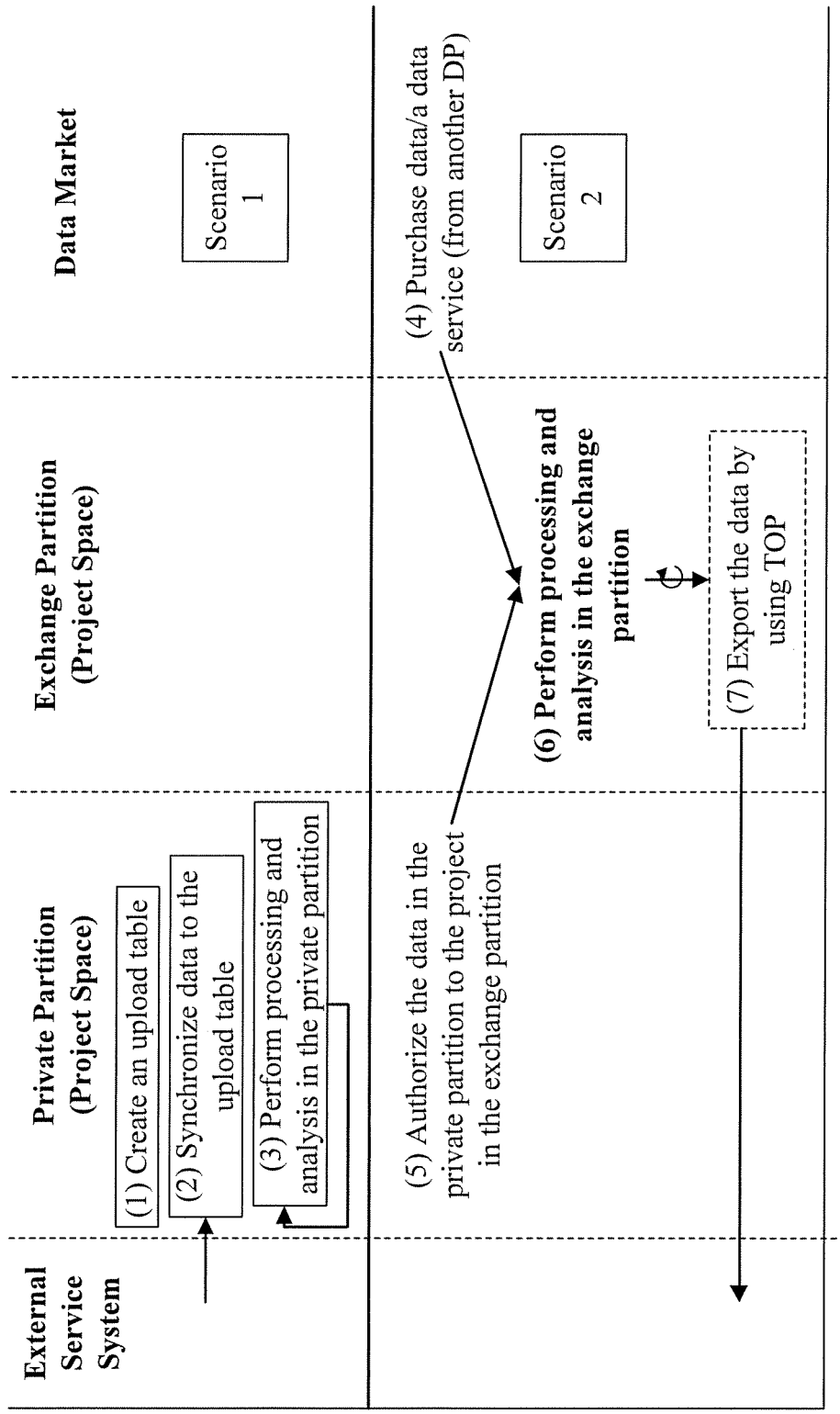
FIG. 6 is a schematic flowchart of the use of data in an exchange partition (with a private partition) according to embodiments of the present disclosure.

FIG. 6 is a schematic flowchart of an exemplary use of data in an exchange partition according to embodiments of the present disclosure. The exchange partition can include a private partition. As shown in FIG. 6, an upload table can be created when an organization uploads data to the private partition. The data can be synchronized to the upload table, and the data can be processed and analyzed in the private partition. Subsequently, the data of the private partition can be authorized to a project in the exchange partition when another DP purchases the data or a data service of the organization. Then, the data can be processed and analyzed in the exchange partition. Finally, a purchasing DP can export the purchased data by using a query layer. The query layer can be a Taobao Open Platform (TOP) provided by a network service provider.

Figure 7:
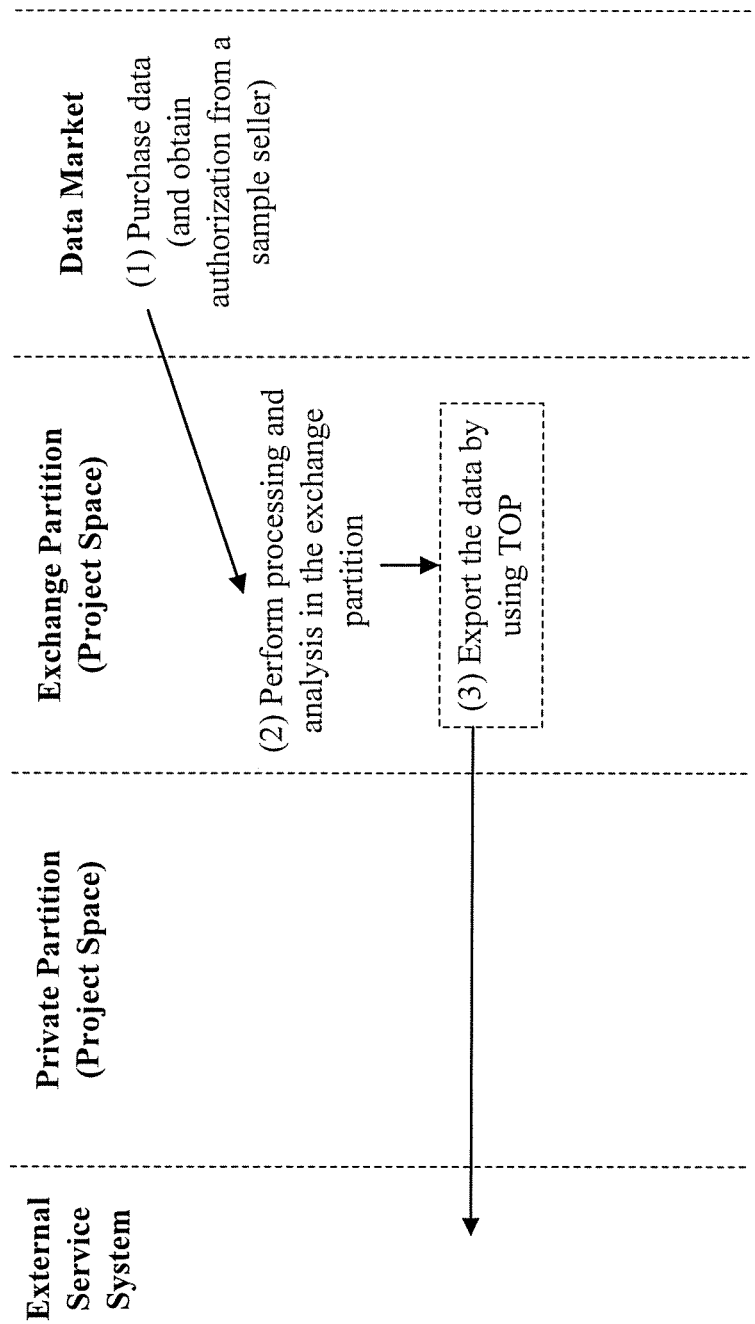
FIG. 7 is a schematic flowchart of the use of data in an exchange partition (without a private partition) according to embodiments of the present disclosure.

FIG. 7 is a schematic flowchart of another exemplary use of data in an exchange partition according to embodiments of the present disclosure. The exchange partition may include no private partition. In FIG. 7, a DP can purchase data in a data market. Then, the DP can process and analyze the purchased data in an exchange partition of the DP, and export the purchased data by using a query layer.

Figure 8:
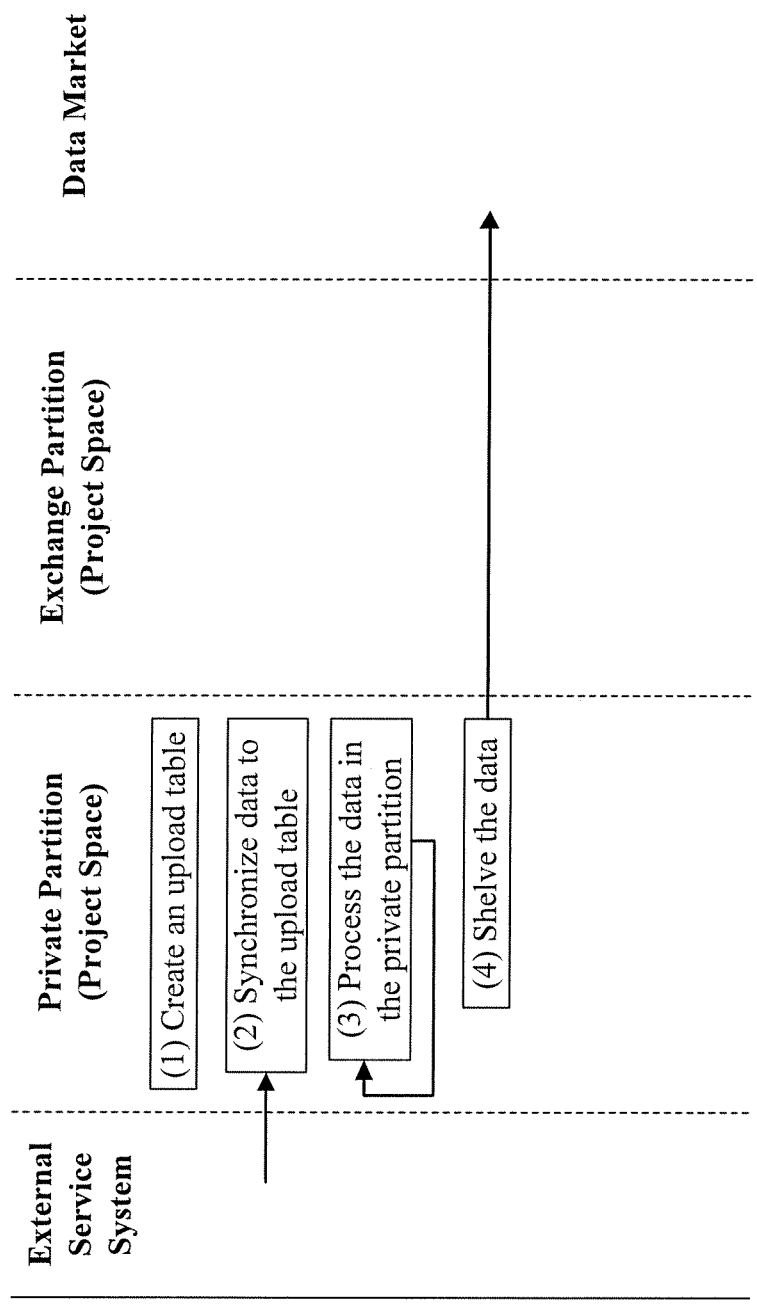
FIG. 8 is a schematic flowchart of the use of data in a private partition according to embodiments of the present disclosure.

FIG. 8 is a schematic flowchart of yet another exemplary use of data in a private partition, according to embodiments of the disclosure. In FIG. 8, an upload table can be created when an organization uploads data to a private partition. Subsequently, the data can be synchronized to the upload table, and the data can be processed and analyzed in the private partition. The data can be then shelved in a data market after the data has been processed.

Figure 9:
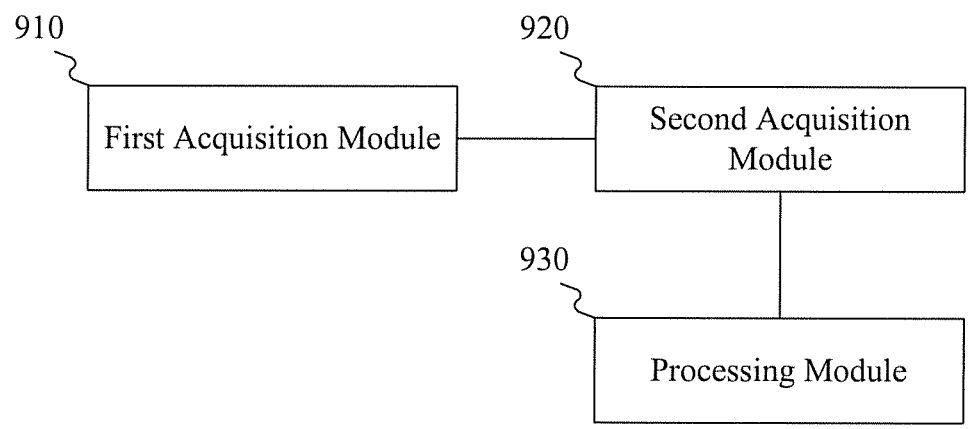
FIG. 9 illustrates a schematic structural diagram of a data storage system according to embodiments of the present disclosure.

To achieve the foregoing technical objective, the present disclosure further provides a data storage system. As shown in FIG. 9, the data storage system can include a storage space corresponding to an organization. The storage space can include a first storage partition and a second storage partition. The system includes a first acquisition module 910, a second acquisition module 920, and a processing module 930.

First acquisition module 910 can be configured to acquire a data processing request type, the storage partition in which a project sending a data processing request is located, and the storage partition of target data information corresponding to the data processing request when the data processing request is received.

Second acquisition module 920 can be configured to acquire a processing strategy matching the storage partitions and the type, the processing strategy being preset in the data storage system.

Processing module 930 can be configured to process the target data information according to the processing strategy and the data processing request.

In some embodiments, the data processing request is used to authorize the target data information to the project if the data processing request type is an authorization request, to enable the project to access the target data information, the project belonging to the organization.

The data processing request can carry target attribute information if the data processing request type is a change request, and the data processing request is used to change attribute information of the target data information to the target attribute information.

The data processing request is used to present the target data information on a data platform if the data processing request type is a presentation request.

In some embodiments, the processing strategy further includes: allowing execution of the data processing request if the storage partition of the target data information is the first storage partition when the data processing request is a presentation request or a change request; allowing execution of the data processing request if the storage partition in which the project is located belongs to the storage space when the data processing request is an authorization request and the storage partition of the target data information is the first storage partition; and allowing execution of the data processing request if the storage partition in which the project is located belongs to the second storage partition when the data processing request is an authorization request and the storage partition of the target data information is the second storage partition.

In some embodiments, the processing module is further configured to reject and discard the data processing request when a processing strategy matching the storage partitions and the type does not exist.

In some embodiments, the system further includes: an import module configured to import uploaded new data into the first storage partition when the new data is received.

It is appreciated that the present disclosure may be implemented by using hardware or by using software with a hardware platform. Based on such an understanding, the technical solutions of the present disclosure may be implemented information of a software product. The software product may be stored in a non-volatile storage medium (which may be a CD-ROM, a USB flash drive, a removable hard disk, or the like), and includes several instructions for instructing a computer device (which may be a personal computer, a server, a network device, or the like) to perform the methods in the implementation scenarios of the present disclosure.

It is appreciated that the accompanying drawings are only schematic diagrams of preferred implementation scenarios. The modules or procedures in the accompanying drawings are not necessarily indispensable for implementing the present disclosure.

It is appreciated that the modules in the apparatus in the implementation scenario may be distributed in the apparatus in the implementation scenario according to the description of the implementation scenario, or may be correspondingly changed to be located in one or more apparatuses different from the apparatus in the implementation scenario. The modules in the foregoing implementation scenario may be combined into one module or may further be divided into a plurality of submodules.

The foregoing sequence numbers in the present disclosure are merely for the convenience of description, and do not imply preference among the implementation scenarios.

The foregoing disclosure is only several specific implementation scenarios of the present disclosure, but the present disclosure is not limited thereto. Any change conceivable by a person skilled in the art shall fall within the protection scope of the present disclosure.

What is claimed is:

1. A method for processing data information in a data storage system including a storage space, the method comprising:
   receiving a data processing request;
   determining a request type of the data processing request, a first storage partition having a project sending the data processing request, and a second storage partition having target data information corresponding to the data processing request; and
   in response to the determination of the request type being an authorization request, processing the authorization request based on the first and second partitions, wherein:
      in response to the first storage partition being an exchange partition, the second storage partition being a private partition, execution of the authorization request is allowed to authorize the target data information in the private partition to the project in the exchange partition for processing the authorized target data information in the exchange partition, wherein new data to be imported from an external service system is stored in the private partition and data to be exported to the external service system is obtained from the exchange partition, and in response to the first storage partition being the private partition, the second storage partition being the exchange partition, the authorization request from the private partition to the exchange partition is rejected.

2. The method of claim 1, wherein the storage space is associated with an organization disposed in the data storage system, and the project is associated with the organization.

3. The method according to claim 1, further comprising:
in response to the determination of the request type being a change request, changing attribute information of the target data information to target attribute information included in the data processing request; and
in response to the determination of the request type being a presentation request, presenting the target data information on a data platform based on the data processing request.

4. The method according to claim 3, further comprising:
allowing execution of the data processing request when the second storage partition is a private partition and the data processing request is the presentation request or the change request;
and
allowing execution of the data processing request when the second storage partition is an exchange partition, the first storage partition is the exchange partition, and the data processing request is the authorization request.

5. The method according to claim 4, further comprising:
establishing, in a current storage partition including the target data information, a view identical to that of the target data information in the second storage partition; and
keeping the view of the target data information in the current storage partition in response to a determination of rejecting the data processing request.

6. A data storage system including a storage space, the system comprising:
a memory storing a set of instructions; and
one or more processors configured to execute the set of instructions to cause the apparatus to perform:
receiving a data processing request, and determining a request type of the data processing request, a first storage partition having a project sending the data processing request, and a second storage partition having target data information corresponding to the data processing request; and
in response to the determination of the request type being an authorization request,
in response to the first storage partition being an exchange partition, the second storage partition being a private partition, allowing execution of the authorization request to authorize the target data information in the private partition to the project in the exchange partition for processing the authorized target data information in the exchange partition, wherein new data to be imported from an external service system is stored in the private partition and data to be exported to the external service system is obtained from the exchange partition, and
in response to the first storage partition being the private partition, the second storage partition being the exchange partition, rejecting the authorization request from the private partition to the exchange partition.

7. The system according to claim 6, wherein the storage space is associated with an organization disposed in the data storage system, and the project is associated with the organization.

8. The system according to claim 6, wherein the one or more processors configured to execute the set of instructions to cause the apparatus to further perform:
in response to the determination of the request type being a change request, changing attribute information of the target data information to target attribute information included in the data processing request; and
in response to the determination of the request type being a presentation request, presenting the target data information on a data platform based on the data processing request.

9. The system according to claim 8, wherein the one or more processors configured to execute the set of instructions to cause the apparatus to further perform:
allowing execution of the data processing request when the second storage partition is a private partition and the data processing request is the presentation request or the change request;
and
allowing execution of the data processing request when the second storage partition is an exchange partition, the first storage partition is the exchange partition, and the data processing request is the authorization request.

10. The system according to claim 9, wherein the one or more processors configured to execute the set of instructions to cause the apparatus to further perform:
rejecting and discarding the data processing request when a processing strategy matching the storage partitions and the type does not exist.

11. A non-transitory computer readable medium that stores a set of instructions that is executable by at least one processor of an electronic device to cause the device to perform a method for processing data information in a data storage system including a storage space, the method comprising:
receiving a data processing request;
determining a request type of the data processing request, a first storage partition having a project sending the data processing request, and a second storage partition having target data information corresponding to the data processing request; and
in response to the determination of the request type being an authorization request,
in response to the first storage partition being an exchange partition, the second storage partition being a private partition, allowing execution of the authorization request to authorize the target data information in the private partition to the project in the exchange partition for processing the authorized target data information in the exchange partition, wherein new data to be imported from an external service system is stored in the private partition and data to be exported to the external service system is obtained from the exchange partition, and
in response to the first storage partition being the private partition, the second storage partition being the exchange partition, rejecting the authorization request from the private partition to the exchange partition.

12. The non-transitory computer readable medium of claim 11, wherein the storage space is associated with an organization disposed in the data storage system, and the project is associated with the organization.

13. The non-transitory computer readable medium according to claim 11, wherein the set of instructions that is executable by the at least one processor of the electronic device to cause the electronic device to further perform:

in response to the determination of the request type being a change request, changing attribute information of the target data information to target attribute information included in the data processing request; and in response to the determination of the request type being a presentation request, presenting the target data information on a data platform based on the data processing request.

14. The non-transitory computer readable medium according to claim 13, wherein the set of instructions that is executable by the at least one processor of the electronic device to cause the electronic device to further perform:

allowing execution of the data processing request when the second storage partition is a private partition and the data processing request is the presentation request or the change request;

allowing execution of the data processing request when the second storage partition is an exchange partition, the first storage partition is the exchange partition, and the data processing request is the authorization request.

15. The non-transitory computer readable medium according to claim 14, wherein the set of instructions that is executable by the at least one processor of the electronic device to cause the electronic device to further perform:

establishing, in a current storage partition including the target data information, a view identical to that of the target data information in the second storage partition; and keeping the view of the target data information in the current storage partition in response to a determination of rejecting the data processing request.

\* \* \* \* \*